(12) United States Patent
Miropolecs et al.

(10) Patent No.: US 9,709,143 B2
(45) Date of Patent: Jul. 18, 2017

(54) VARIABLE HYDRAULIC TRANSMISSION

(71) Applicants: Stanislavs Miropolecs, Riga (LV); Pāvels Miropolecs, Dreilini (LV); Igors Ļudinovskis, Riga (LV)

(72) Inventors: Stanislavs Miropolecs, Riga (LV); Pāvels Miropolecs, Dreilini (LV)

(73) Assignees: Stanislavs Miropolecs, Riga (LV); Pavels Miropolecs, Dreillini (LV); Igors Ludinovskis, Riga (LV)

( * ) Notice: Subject to any disclaimer, the term of this patent is extended or adjusted under 35 U.S.C. 154(b) by 206 days.

(21) Appl. No.: 14/420,816

(22) PCT Filed: Nov. 27, 2012

(86) PCT No.: PCT/LV2012/000020
§ 371 (c)(1),
(2) Date: Feb. 10, 2015

(87) PCT Pub. No.: WO2014/030989
PCT Pub. Date: Feb. 27, 2014

(65) Prior Publication Data
US 2015/0240926 A1    Aug. 27, 2015

(30) Foreign Application Priority Data
Aug. 21, 2012    (LV) ...................................... P-12-136

(51) Int. Cl.
*B60K 20/00*    (2006.01)
*G05G 9/00*    (2006.01)
(Continued)

(52) U.S. Cl.
CPC ............. *F16H 39/30* (2013.01); *F16H 39/26* (2013.01); *F16H 61/427* (2013.01); *F16H 61/437* (2013.01); *Y10T 74/20018* (2015.01)

(58) Field of Classification Search
CPC ...... F16H 39/26; F16H 61/427; F16H 61/437; F16H 39/30; F16H 39/36
(Continued)

(56) References Cited

U.S. PATENT DOCUMENTS 2,927,430 A * 3/1960 Castles, Jr. ........... F04C 2/3448
                                                    418/22
4,008,982 A * 2/1977 Traut ...................... F01C 1/104
                                                    417/204
(Continued)

FOREIGN PATENT DOCUMENTS

SU          175797 A1     1/1966
SU          203414 A1    12/1967
(Continued)

OTHER PUBLICATIONS

International Search Report issued in PCT/LV2012/000020, mailed on Apr. 24, 2013 (2 pages).
(Continued)

*Primary Examiner* — William Kelleher
*Assistant Examiner* — Jake Cook
(74) *Attorney, Agent, or Firm* — Osha Liang LLP

(57) ABSTRACT

The invention refers to hydraulic rotation transmissions and can be used in power transmissions and transmissions where the stepless ratio variation is essential. It can also be used as stepless speed transmission for vehicles (FIG. 1). Getting any transmission ratio with higher performance factor is achieved by applying in the hydraulic transmission new scheme, including motionless and movable bodies containing two coupled rotors, composing of camshafts with pistons and separated by motionless wall. Transmission ratio varies from 0 to maximal value displacing the movable body in axial direction by means of overhanging control arm.

14 Claims, 16 Drawing Sheets

(51) Int. Cl.
*F16H 39/30* (2006.01)
*F16H 39/26* (2006.01)
*F16H 61/427* (2010.01)
*F16H 61/437* (2010.01)

(58) Field of Classification Search
USPC .................................. 74/730.1, 655; 60/491
See application file for complete search history.

(56) References Cited

U.S. PATENT DOCUMENTS

| | | | | |
|---|---|---|---|---|
| 4,028,021 | A | * | 6/1977 | Berkowitz .............. F01C 1/22 418/129 |
| 4,296,500 | A | * | 10/1981 | Monties .............. A61M 1/1081 128/899 |
| 4,545,204 | A | * | 10/1985 | Whalen .................. F16H 39/28 418/28 |
| 4,598,546 | A | * | 7/1986 | Van Kanegan ......... F16H 39/26 60/491 |
| 5,769,619 | A | * | 6/1998 | Crvelin .................. F01C 17/04 418/116 |

FOREIGN PATENT DOCUMENTS

| | | |
|---|---|---|
| SU | 1712710 A1 | 2/1992 |
| WO | 89/05754 A1 | 6/1989 |

OTHER PUBLICATIONS van Basshuysen, Richard; et al.; "Handbuch Verbrennungsmotor. Grundlagen, Komponenten, Systeme, Perspektiven"; 3 vollstandig uberarbeitete und erweiterte Aufla; ATZ/MTZ Fachbuch (6 pages).

Vakhlamov, V.K.; et al.; "Theory and construction of cars and motors"; Textbook; Moscow; Publishing Centre "Academy"; 2010 (4 pages).

* cited by examiner

Figure 4A:
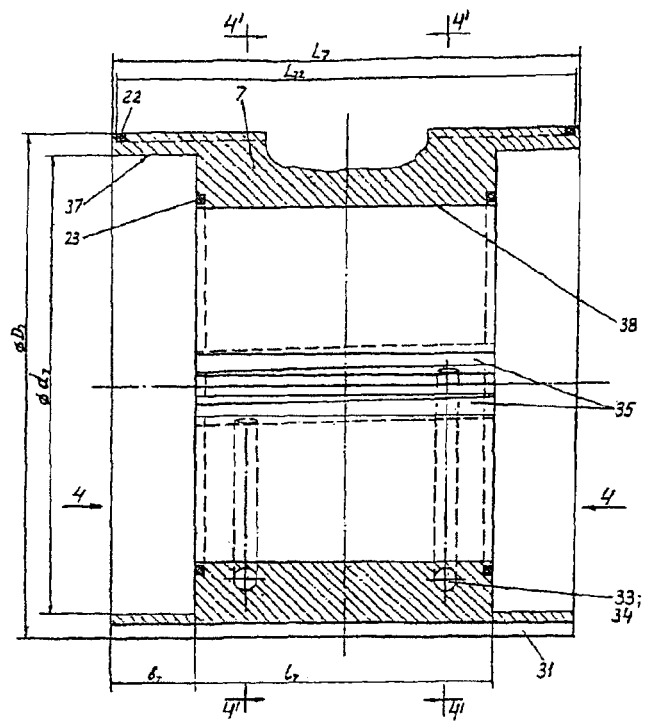
Figure 4B:
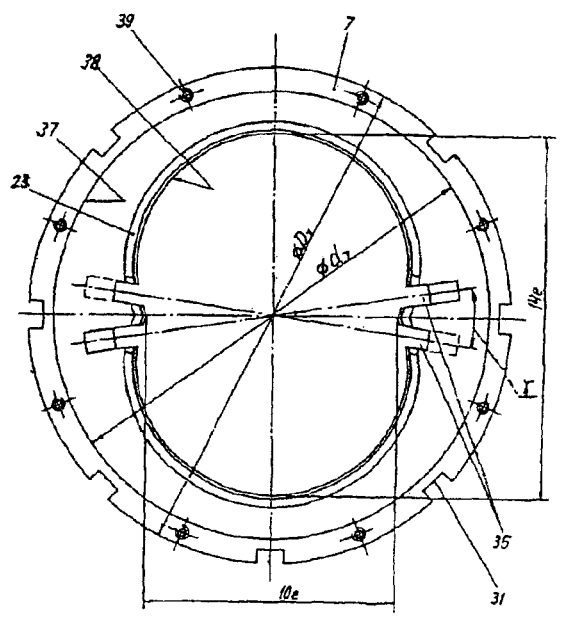

View 4(fig. 4a)

a.

Figure 5:
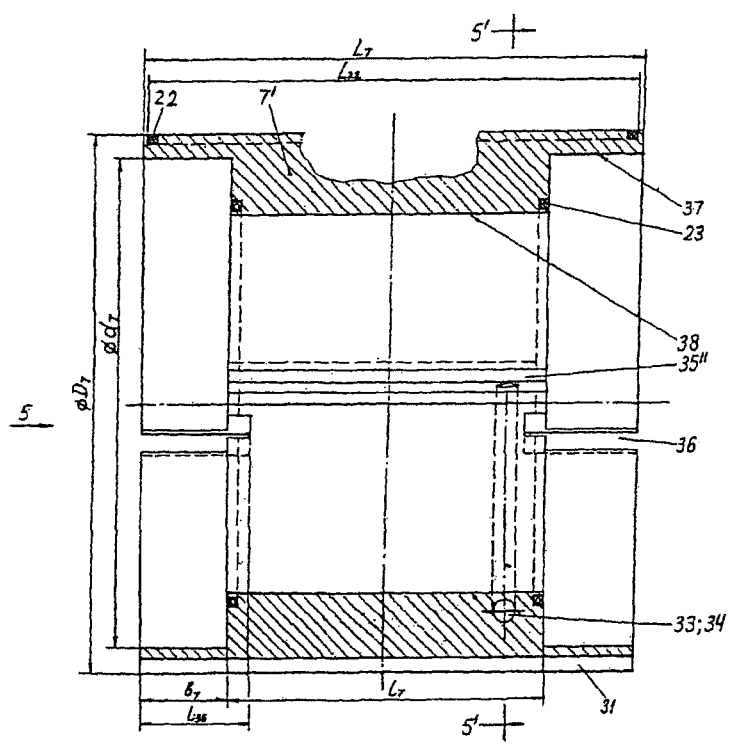

View 5 (fig. 5 a)

5'–5' (fig. 5a)

a.

View 6 (fig.6a)

6'-6' (fig. 6a)

Figure 7A:
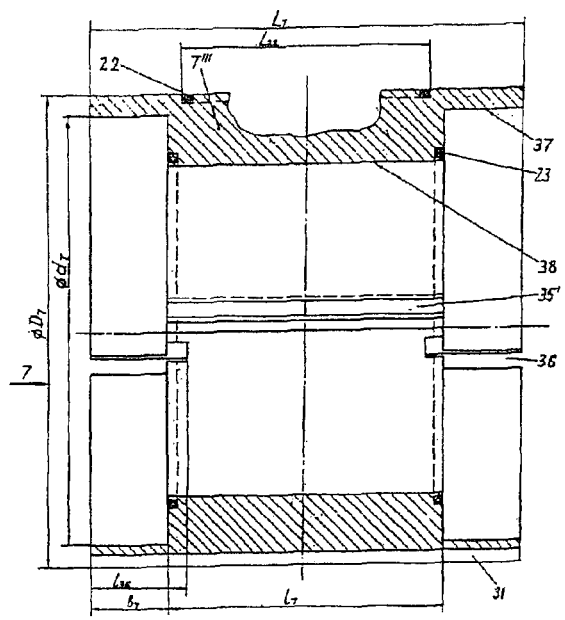

View 7 (fig. 7a)

Figure 8A:
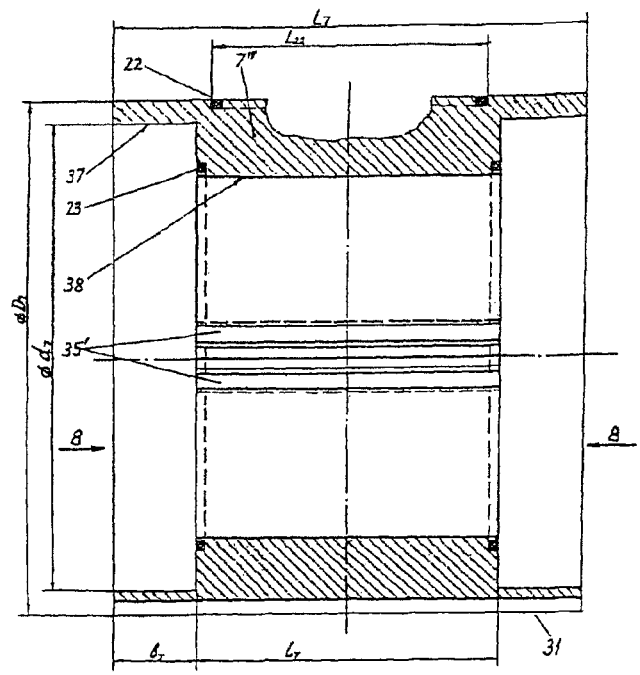

View 8 (fig.8a)

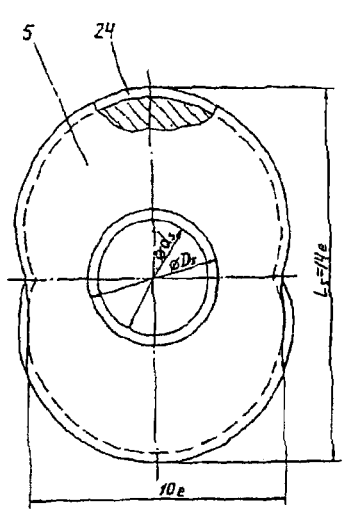
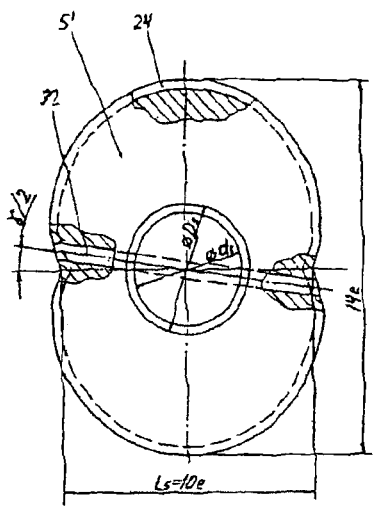
Fig. 9a
Fig. 9b
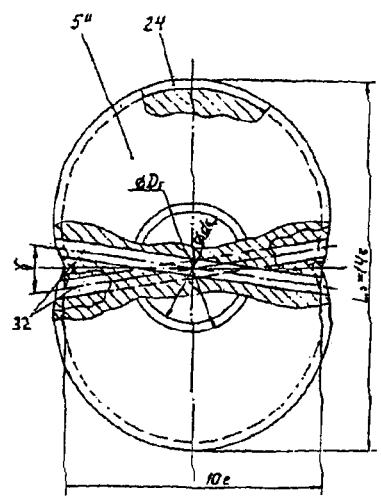
Fig. 9c

VARIABLE HYDRAULIC TRANSMISSION

DISCLOSURE OF THE INVENTION

The invention refers to hydraulic rotation transmissions and can be used in power transmissions and kinematic sequences where stepless variation of transmission ratio is essential, particularly in vehicles transmissions. Its goal is to raise transmission performance factor, maximal rotation speed, power and reduce the device dimensions.

Currently in use is vehicle hydro mechanical transmission [1, 2] consisting of torque convertor mechanical gearbox, lamellar frictional clutch and belt-type brake assembly, closed in split type housing.

The mentioned transmission has the following detriments:
- significant mass and dimensions;
- complicated design, increasing production labour hours and cost of the device;
- high power losses in frictional clutches, band-type brakes, reducing performance factor of the device.

The scope of the present invention is achieved by means of using camshafts with hypotrochoid profile piston separated by shaped wall and placed in a cartridge. Mentioned design enhancements together with previously known engineering solutions give the following arrangement.

The inner components of the device with a controlled cartridge are compactly placed in the hollow housing and include the controlled cartridge, fixed partitions inside the cartridge and two rotors. The housing has an opening for a control arm, connected with the cartridge, and its ends are closed by caps. The core divides the cartridge cavity in two parts with variable volumes and together with the caps serve as support for camshafts with pistons fitted out of centre. Each of the rotors can be driving and driven and allows rotation in both directions.

The transmission ratio of the device varies by displacing cartridge-to-fixed housing and core. At that ratio of volumes of two parts of cartridge internal space and consequently ratio of shafts rotation speed varies proportionally with cartridge displacement.

Figure 1:
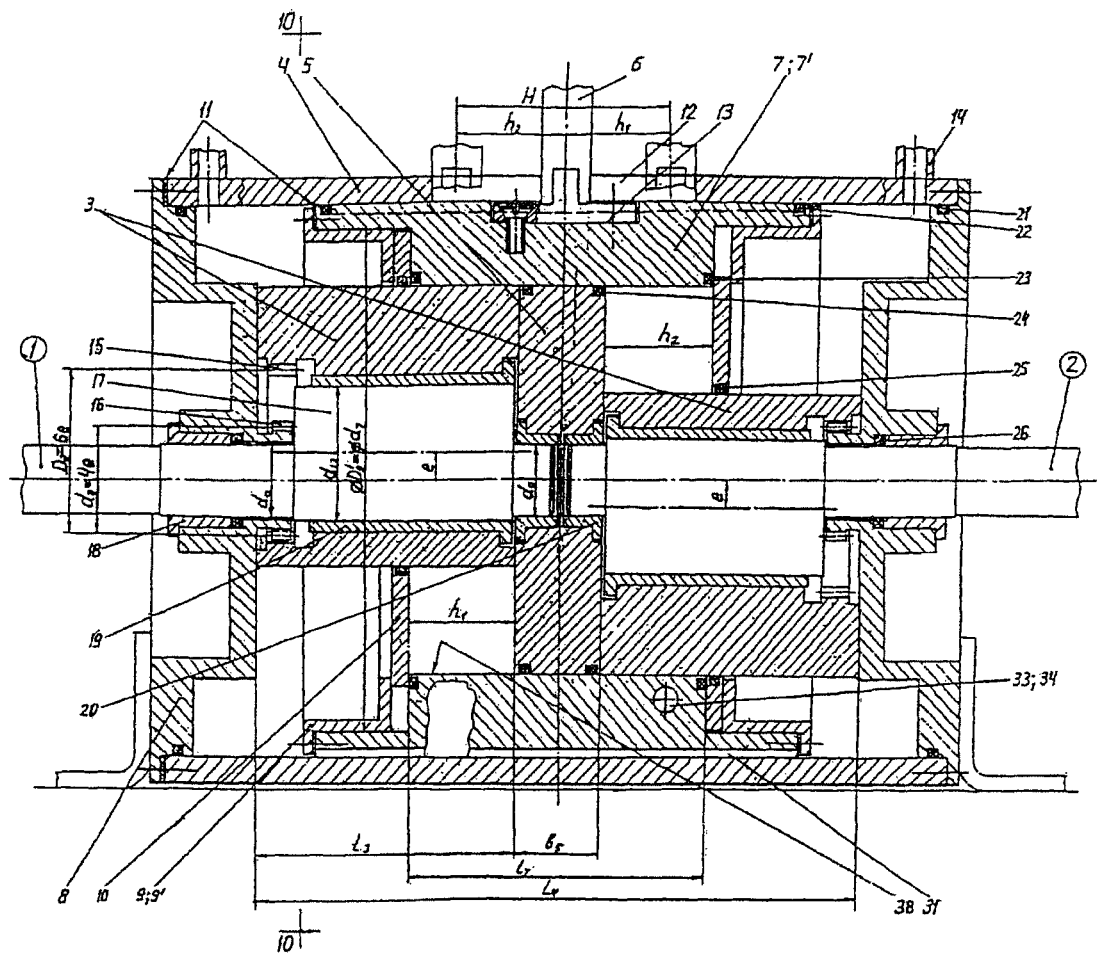
Figure 2A:
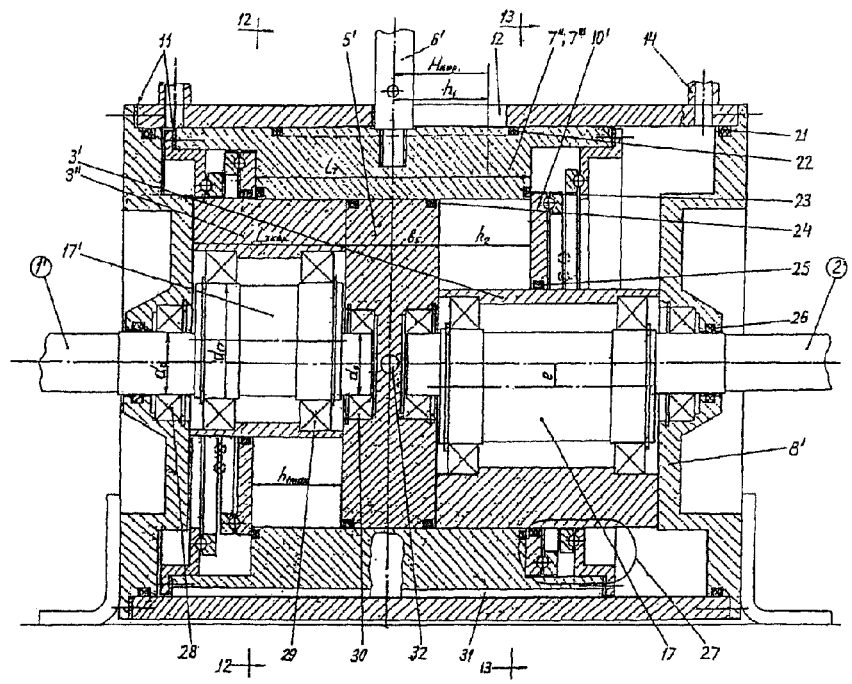
Figure 2B:
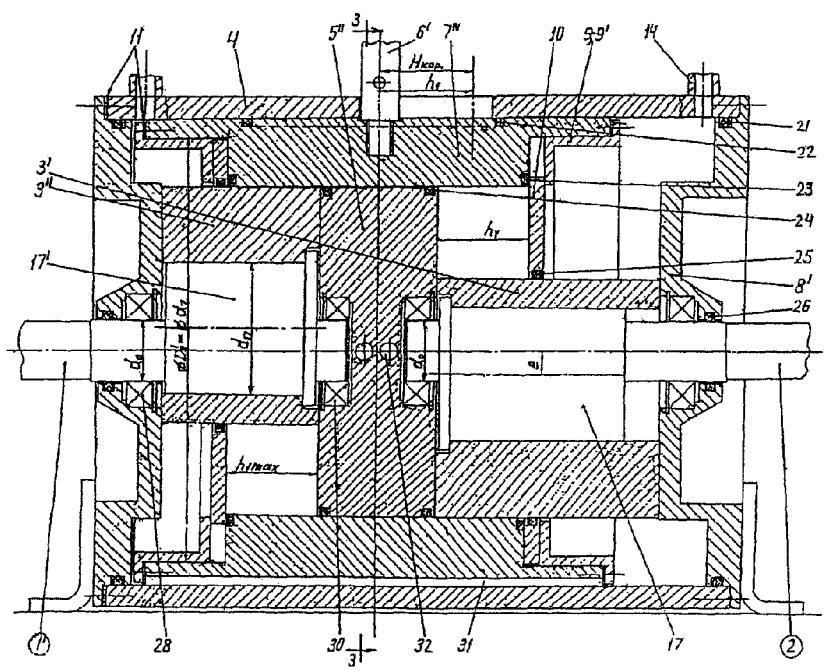
Figure 3:
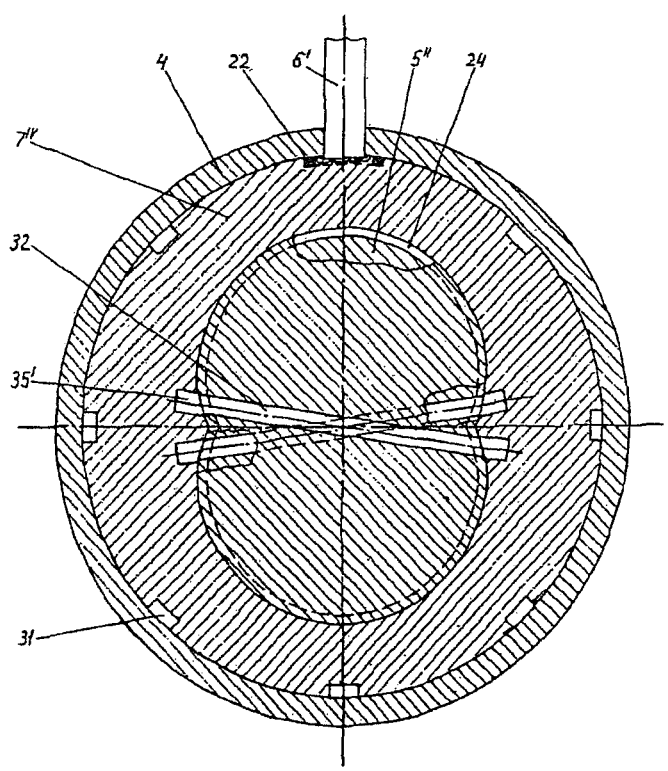
Figure 4C:
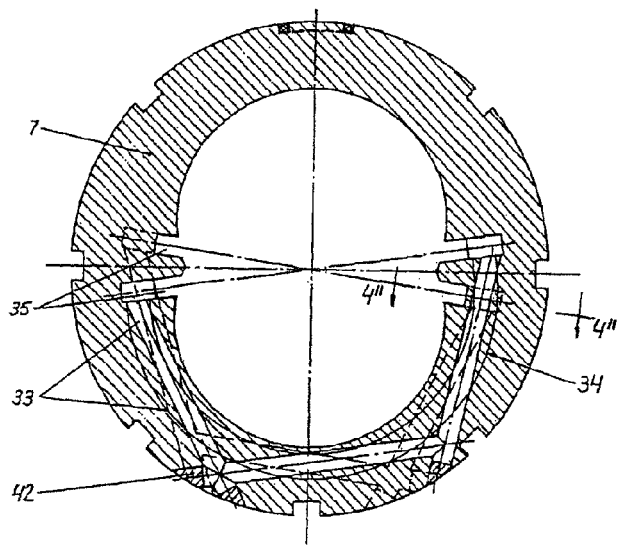
Figure 6:
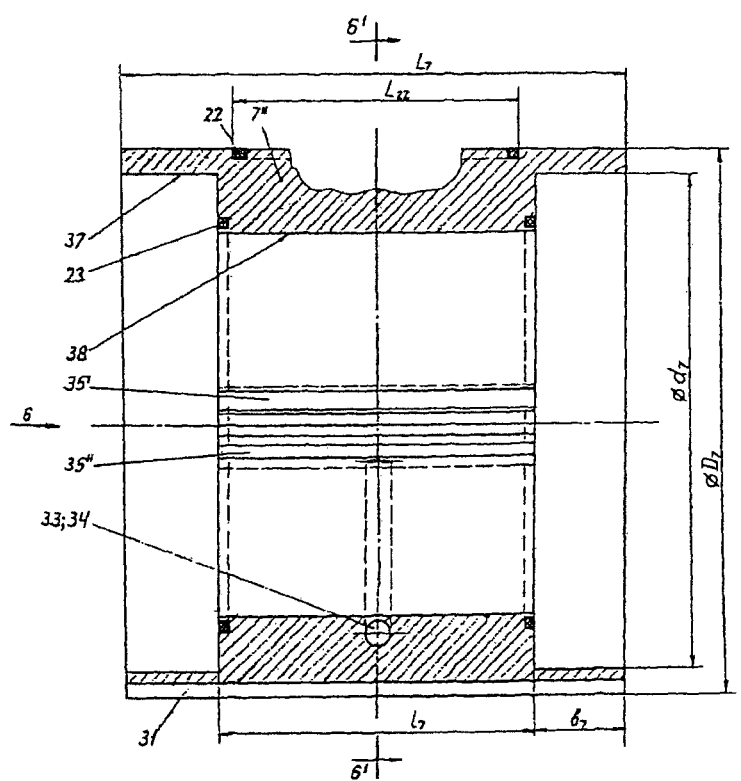
Figure 8B:
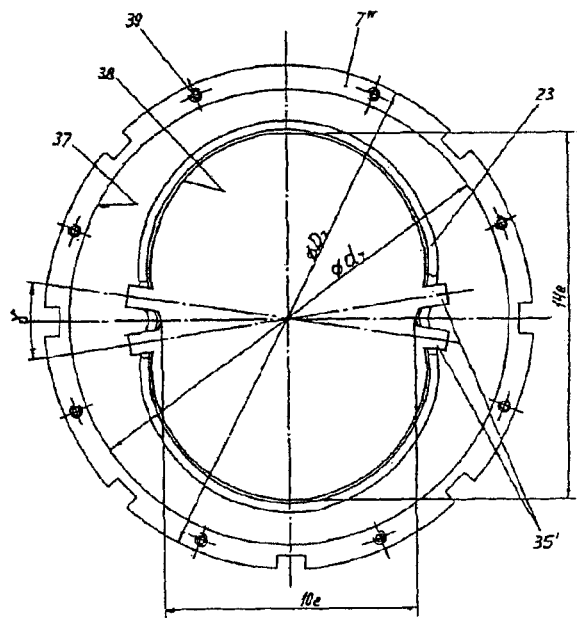
Figure 10A:
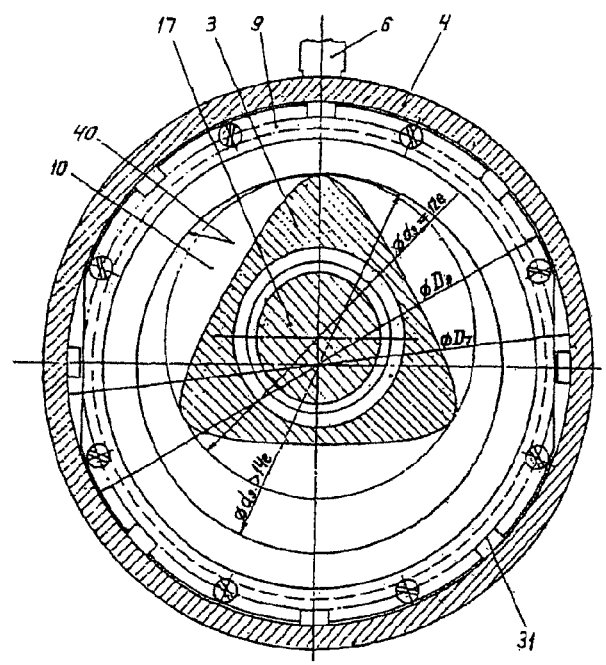
Figure 10B:
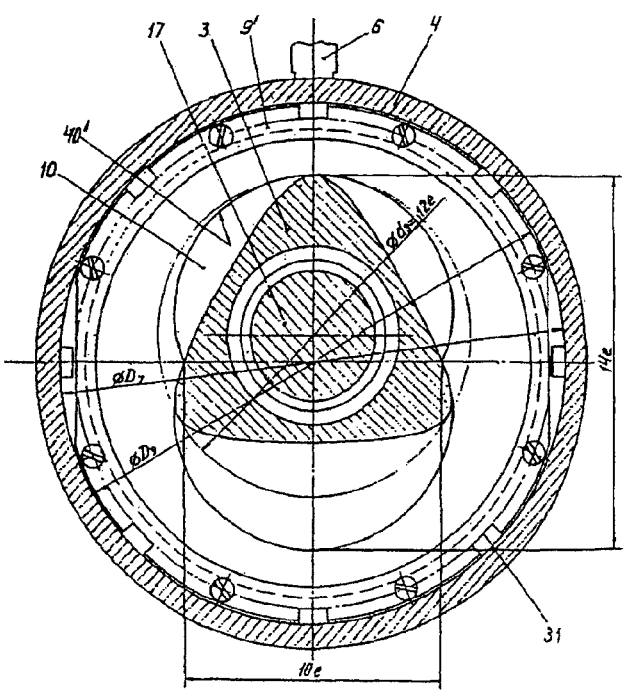

The invention is illustrated with the following figures:

FIG. 1 Basic structure of the device in longitudinal cross-section;

FIG. 2 Longitudinal cross-section of the shortened reduction hydro transmission with rod-type arm, rotation bearings on the shafts and absence of gear transmission for versions:
a—with one channel core and rolling compensator instead clamps; b—with two channels core and fitting of pistons on the shafts without bearings;

FIG. 3 Device cross-section view taken along line 3-3 in FIG. 2*b*;

FIG. 4 Cross-sections and view of the cartridge 7 in FIG. 1:
a—longitudinal cross-section of the cartridge;
b—view along arrow 4 in FIG. 4*a*;
c—cross-section view taken along line 4'-4' in FIG. 4*a*;
d—cross-section view taken along line 4"-4" in FIG. 4*c*;

FIG. 5 Cross-sections and view of the cartridge $7^I$ in FIG. 1:
a—longitudinal cross-section of the cartridge;
b—view along arrow 5 in FIG. 5*a*;
c—cross-section view taken along line 5'-5' in FIG. 5*a*;

FIG. 6 Cross-sections and view of the cartridge $7^{II}$ in FIG. 2*a*:
a—longitudinal cross-section of the cartridge;
b—view along arrow 6 in FIG. 6*a*;
c—cross-section view taken along line 6'-6' in FIG. 6*a*;

FIG. 7 Cross-sections and view of the cartridge $7^{III}$ in FIG. 2*a*:
a—longitudinal cross-section of the cartridge;
b—view along arrow 7 in FIG. 7*a*;

FIG. 8 Cross-sections and view of the cartridge $8^{IV}$ in FIG. 2*b*:
a—longitudinal cross-section of the cartridge;
b—view along arrow 8 in FIG. 8*a*;

FIG. 9 View at the core end face for the following versions
a—simple core 5 in FIG. 1;
b—core 5' with one channel in FIG. 2*a*;
c—core 5" with two channels in FIG. 2*b*;

FIG. 10 Cross-section view taken along line 10-10 in FIG. 1 for versions:
a—with round central hole in the clamp 9;
b—with shaped central hole in the clamp 9';

FIG. 11 Views of the movable walls for the following versions:
a—wall 10 for clamp FIGS. 1 and 2*b* accommodating,
b—wall 10' for compensator FIG. 2*a* accommodating;

FIG. 12 Cross-section view taken along line 12-12 in FIG. 2*a* with consequent turn of the cam 17' and shaft 1' by angle α from vertical for versions a—with the cartridge $7^{II}$, b—with the cartridge $7^{III}$.

Figure 13A:
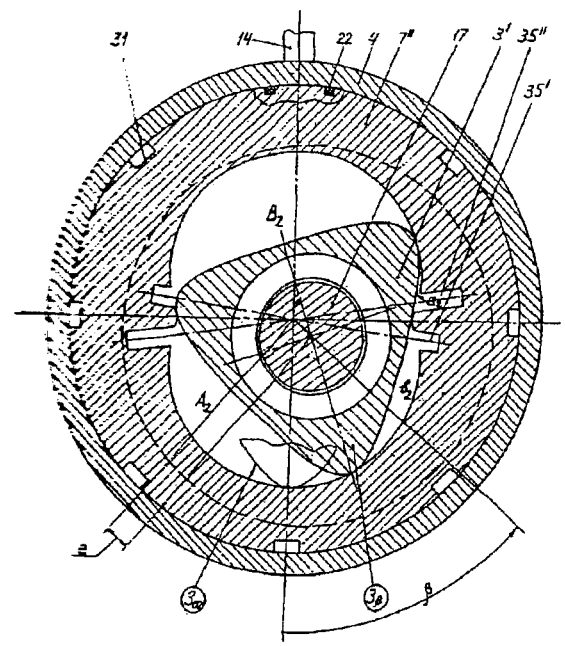
Figure 13B:
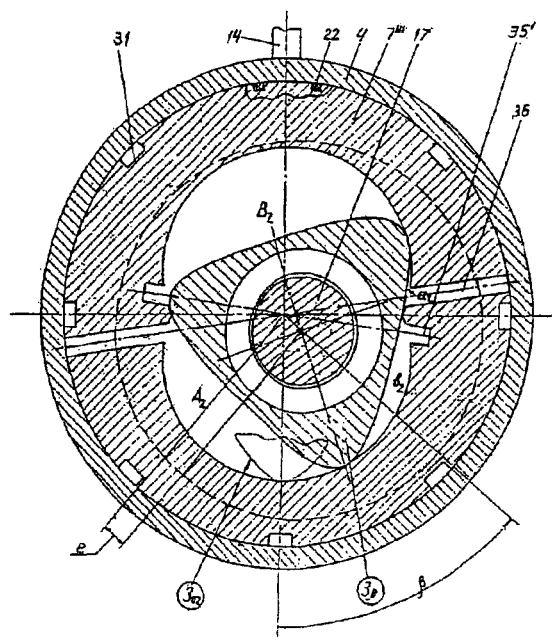

FIG. 13 Cross-section view taken along line 13-13 in FIG. 2*a* with consequent turn of the cam 17 and shaft 2 by angle β from vertical for versions a—with the cartridge $7^{II}$, b—with the cartridge $7^{III}$.

The FIG. 2 presents the following available modifications in the hydro transmission as against basic version in the FIG. 1:

- shortened version of the device with shortened driving shaft 1' and piston 3";
- ball bearings 28, 29, 30 are used in supports of the shafts and pistons instead of shell bearings 18, 19, 20 (FIG. 1);
- version of pistons running fit on the shafts without bearings (FIG. 2*b*);
- caps and pistons without toothed rims 15 and 16 and hydro transmission made without gears;
- rolling compensators 27 (FIG. 2*a*) are used instead clamps 9 and 9';
- screwed in rod arm 6' is used instead of flanged arm 6;
- cores 5' or 5" with one or two channels 32 are used instead core 5 without channels;
- new cartridges $7^{II}, 7^{III}, 7^{IV}$) differ from basic version of cartridges 7 and $7^I$ with number and type of liquid by-pass channels according the following table.

The first modification—shortened version intended for reducing transmission with short driving shaft 1'.

Each of the first six modifications can be combined with any one or several other modifications, but each core version can be used only with certain cartridge version, which is marked by + in the following table.

| FIG. | Cartridge version | Description | FIG. 1; 9a<br>Core version 5<br>without holes | FIG. 2a, 9b<br>Core version 5'<br>one hole | FIG. 2b, 9c<br>Core version 5"<br>two holes |
|---|---|---|---|---|---|
| 1, 4 | 7 | 4 variable depth channels and 2 by-pass channels | + | | |
| 1, 5 | $7^I$ | 2 deep channels, 4 flow end channels and 1 by-pass channel | + | | |
| 2a, 6 | $7^{II}$ | 2 deep channels, 2 shallow channels and 1 by-pass channel | | + | |
| 2a, 7 | $7^{III}$ | 2 shallow channels and 4 flow end channels | | + | |
| 2b, 8 | $7^{IV}$ | 4 shallow channels | | | + |

From all possible combinations cartridge—core, presented in the table the smallest by axial dimensions and mass are 7-5 and $7^I$-5, where the core has the minimal thickness. Less laborious is combination $7^{IV}$-5", where the cartridge has only 4 similar shallow flow channels and there is no by-pass and slotted end channels. The main groups and parts of the device are made, according to the abovementioned design and functional approach, in the following mode.

The housing 4 (FIG. 1, 2) is a device, containing mechanism of speed rotation variation. There are longitudinal opening 12 providing outlet for the control arm 6 or 6' and preventing arm and cartridge rotation and assuring both parts working travel H. The device can be provided with several openings as well as several arms. The housing (or caps 8 and 8') should be provided with closable fitting 14 or holes for power fluid draining/filling or topping-up in case of liquid evaporation or leakage or for flushing in case of overheating. Ends of the housing have several threaded holes for cap fixing.

Caps 8 and 8' (FIG. 1, 2) has central hole with groove for seal and shaft bearing, as well simple fixing bores faced threaded holes in the housing ends. The cap could be provided with mentioned above fitting. The cap can be made in two versions. The first version 8 (FIG. 1) differs with presence of the gear 16 protruding towards the hydro transmission. Diameter of the gear pitch line is equal to four eccentricity on the shaft equal $d_d=4e$. The gear can be machined integrally with the cap or fixed to it as a separate part. The second version is a cap 8' without gear (FIG. 2)

Both shafts 1 (or 1') and 2 (FIG. 1, 2) have similar design, but can slightly differ, for example, with length and outer parts, connected to an actuator or power recipient by any of known methods. Part of the shaft, concluded between cap and core 5 (or 5', 5") is machined as cylindrical cam 17 or 17' with eccentricity e relative to the shaft axis. The eccentricity determines parameters of the gear, toothed wheel, piston hypotrochoid, profile of the core and cartridge borings. The cam can be made integrally with the shaft or fixed on it. In the first case the cam diameter should be greater or equal to sum of 2e and diameter of at least one part of the shaft, adjacent to the cam, that is $d_{17} \geq d_0+2e$, to assure assembling conditions.

The inner end of the shaft leans on central part of the core through shell bearing 20 or ball bearing 30, but output part of the shaft leans on the cap 8 and 8' through bearings 18 or 28. In case of reducing transmission minimal dimensions and mass of the transmission can be achieved only if one shaft is shorter than the other, at that being only driving. Maximal length of the inner working part $h_{1max}$ (FIG. 2) of the short shaft 1' with piston 3" should be twice shorter than length $h_{2max}$ of the same part of the long shaft 2.

Pistons 3 (or 3', 3") of the both of internal mechanism rotors, as well as the shafts have similar design, but can slightly differ, for example, with their length. The piston cross-section profile is close curve—hypotrochoid with three peaks and circumscribed circle diameter $d_3=2e$. It is the Reuleaux triangle. The curve's equations will be presented further. The pistons have axial boring for movable seating on the shaft's cam directly or with shell 19 or ball 29 bearings. In the first case the piston or the cam should be made of appropriate antifriction material, for example bronze and similar. It is possible to use two piston designs. First version 3 (FIG. 1) foresees sunk gear 15 on one end of the piston, at that diameter of the gear pitch line is equal $D_d=5e$. The gear can be machined integrally with the piston or fixed to it as a separate part. Second version foresees pistons 3' and 3" (FIG. 2) without gears. Reducing transmission is provided with shortened piston 3" on the driving shaft.

Figure 4D:
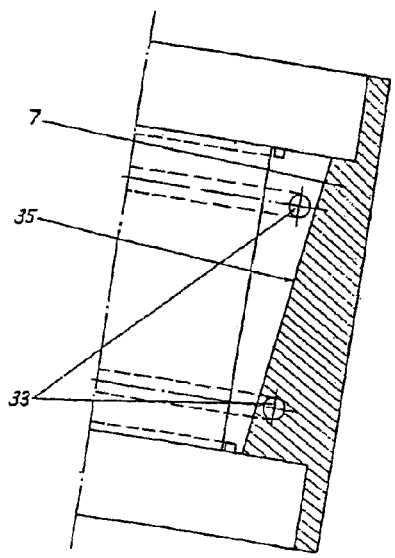
Figure 5B:
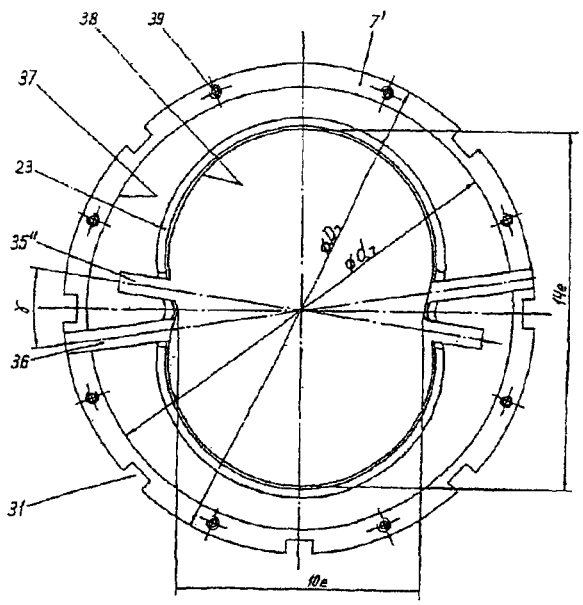
Figure 5C:
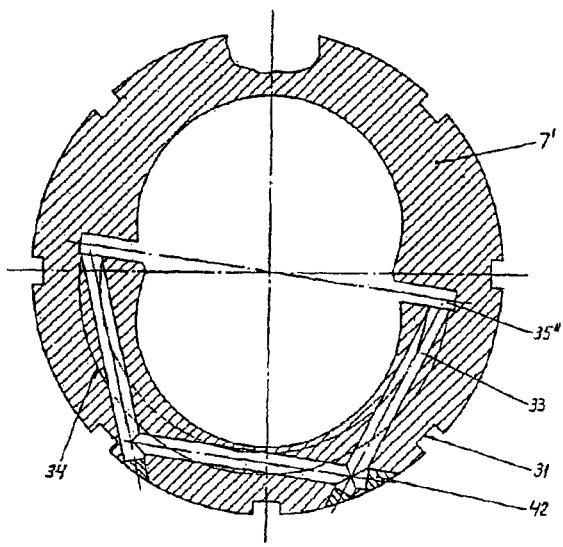

Cartridge 7, $7^I$, $7^{II}$, $7^{III}$, $7^{IV}$, (FIG. 4, . . . , 8) can be made in five versions, described below. Their common design features are as follows:

- external surface of the cartridge is cylinder with diameter less than internal diameter of the housing 4;
- cartridge ends provided with several threaded bores for fixing clamps 9 and 9' (FIG. 1) or compensators 27 (FIG. 2a);
- external surface should be provided with several axial channels 31 for better connection of external cavities between them on the cartridge displacement;
- there is internal pass-through opening 38 which cross-section contour machined as external part of epytrochoid in the form of closed polyline with two axis of symmetry—long $L_5=14e$ and short $I_5=10e$ (FIG. 4b, 8b), which equations will be presenter further; the curve rolls off with sliding from within by piston's hypotrochoid at shaft rotation;
- the both ends of the cartridge are bored out from the face by depth $b_7$, which should be less, then sum of movable wall 10 thickness (FIG. 1, 11) and length of clamp 9 (or 9') part, inserted into the cartridge, or thrust compensator 27 length if applied; the socket diameter is greater than sum of movable wall diameter and double eccentricity ($d_7 > D_{10}+2e$);
- both cartridge ends are provided with the seal groove 23 around and near the opening 38 (FIG. 4b);
- nominal length between internal ends of the cartridge is calculated in terms of maximal cartridge travel H and core 5 thickness $b_5$: $I_7=H+b_5$ (FIG. 1) for the basic hydro transmission version and $I_7=2\ H_{short}+b_5$ for shortened reducing transmission;

mounting spot for the control arm should be provided on the cartridge external surface, it can be, for example, threaded hole for screwing in of the rod type control arm 6' (FIG. 2) or local socket 13 with holes for flange type control arm 6 (FIG. 1); mounting spot can be positioned in any place of the external cylindrical surface and there could be several mounting spots as well as several control arms on the cartridge;

closed groove for seal 22 (FIG. 1, 2) should be made in the cartridge or in the housing around the control arm mounting spot; the length of the groove external contour $L_{22}$ on the cartridge (FIG. 4a, . . . , 8a) should be sufficient to assure that seal does not enter within the opening at the extreme positions of the cartridge;

there are flow channels connecting cavities on both sides of the core 5 or 5' and 5". The channels should be disposed along and near of internal ribs of the opening; the number of channels, their structure and length depend on the cartridge version described further on;

I version of the cartridge 7 (FIG. 4) intended for hydro transmission version where power fluid is enclosed in the cartridge without connection with cavities external to the cartridge; the version foresees:

presence of four internal flow channel of variable depth (FIG. 4d);

diametric channels connected between them through two by-pass channels 33 or 34 (FIG. 4a, 4c);

cross-section axes of the adjacent flow channels should be disposed under such angle γ (FIG. 4b) between them, which assure sufficient thickness and strength of the partition between them;

by-pass channel can be composed of straight sections 33 or made as solid curve 34, as it is shown by thin lines in FIG. 4c; in the last case the cartridge is mated of parts by section plain passing along the channel;

II version of the cartridge $7^I$ (FIG. 5) is intended for the device where some internal cavities of the cartridge are tailored between them through external cavities, but the other through the channels of the cartridge; the version foresees:

two deep internal flow channels 35" disposed diametrically and connected between them as in the version I through by-pass channel 33 or 34 (FIG. 5c);

two radial face channels 36 (FIG. 5a, 5b) are slotted in the cartridge ends, which depth $l_{36}$ is greater than depth $b_7$ of the cartridge end socket by value not less than channels width.

Figure 6B:
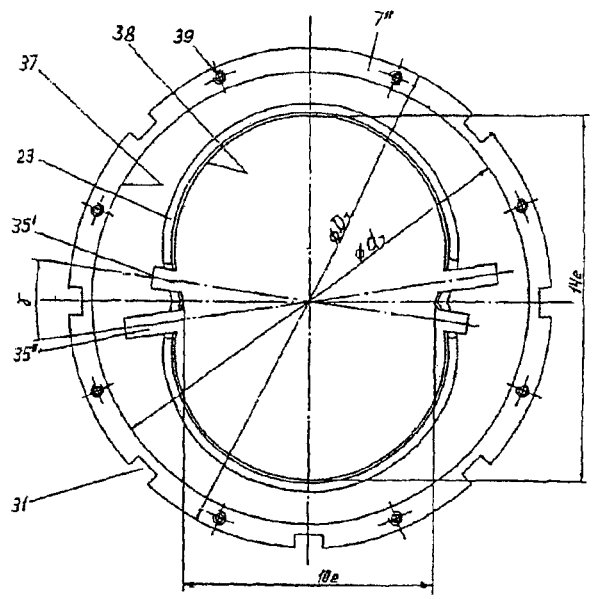
Figure 6C:
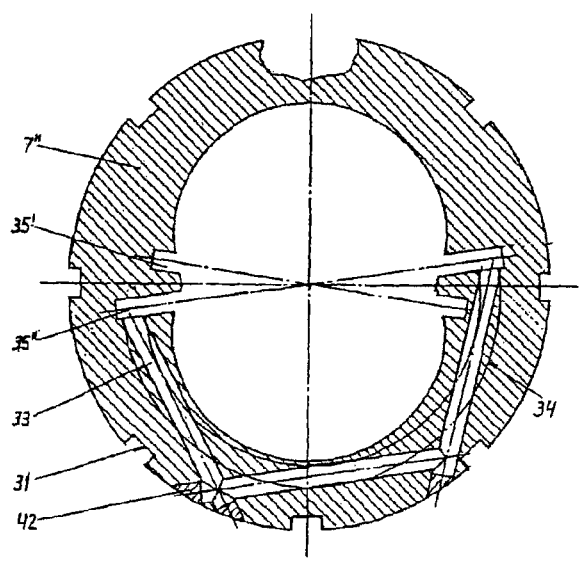

III version of the cartridge $7^{II}$ (FIG. 6), as the version I, provides power fluid circulation only inside the cartridge; the version foresees:

two shallow 35' and two deep 35" flow channels, at that uniform channel are disposed diametrically (FIG. 6b);

two deep flow channels connected between them through by-pass channel 33 or 34 (FIG. 6c).

Figure 7B:
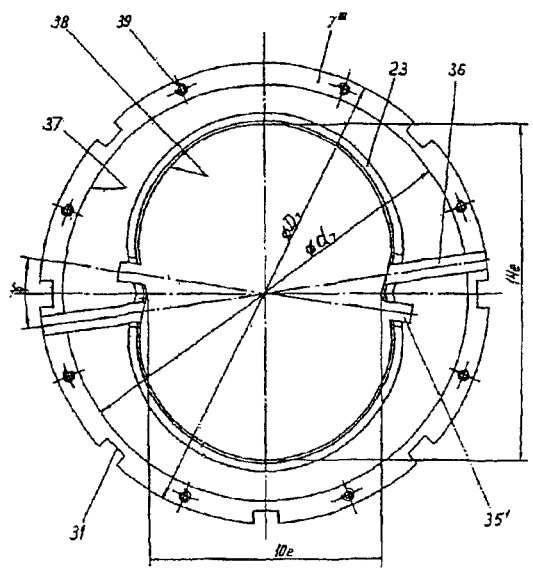

IV version of the cartridge $7^{III}$ (FIG. 7), as the version II, provides power fluid circulation through flow channels inside the cartridge and through external cavities; the version foresees:

two shallow flow channels 35' (FIG. 7b);

two radial face channels 36 (FIG. 5a, 5b) are slotted in the same mode as in the version II.

V version of the cartridge $7^{IV}$ (FIG. 8) foresees only 4 shallow flow channels 35' for power fluid circulation only inside the cartridge.

In versions 7, $7^I$, $7^{II}$ the by-pass channels eliminate deficiencies of inflow and outflow of the fluid in the cavities. It is possible do without channels 33 and 34 in case of precise machining and reliable pressurization.

Core 5 or 5' and 5" (FIG. 1, 2, 9) is disposed inboard of the device. It is restrained form axial displacement by the ends of the pistons 3, 3' and 3" and from turn around the longitudinal axes of the device by cartridges 7, . . . , $7^{IV}$. The core thickness depends on shaft support parts length inserting in it and number of borings 32. Central parts of the core are bored out for accommodation of shaft support bearings. The cross-section curve of the core external surface is the same external border of epytrochoid as of the cartridge longitudinal opening cross-section, but with tolerances, allowing free and hermetic displacement of the cartridge relative the core. It is admissible to make seal grooves 24 on the core outer surface near the ends. Three versions of the core can be used. Version I of the core 5 (FIG. 1, 9a) is simple without borings. Version II of the core 5' (FIG. 2, 9b) foresees one boring 32. Version III of the core 5" (FIG. 2b, 9c) has two such borings. The borings are end-to-end and pass parallel to the core ends and by the same angle γ/2 as flow channels of the cartridge (FIG. 4, . . . , 8). In versions I and II of the core counterbores for shell bearings could be pass through.

Borings as well as by-pass channels of the cartridge eliminate deficiencies of inflow and outflow of the fluid in the cavities. It is possible do without boring 32 and, consequently, without core types 5' and 5" in case of precise machining and reliable pressurization.

Clamps 9 and 9' (FIG. 1, 10) are mounted on the cartridge ends. Clamps can be made in two versions. The both versions have similar flange of external diameter $D_9$, smaller than external diameter $D_7$ of the cartridge (FIG. 10), provided with fastening holes facing threaded holes on the cartridge ends. Part of the clamp inserted in the cartridge has external diameter $D'_9$ equal to the diameter $d_7$ of the cartridge end counterbore. Versions differ only with central hole. In version I (FIG. 10a) hole is circular 40 of diameter $d_9$ greater than diameter of major axis $L_5$ of the cores 5, 5' and 5" (FIG. 9). The central hole 40' of the version II is shaped in the same mode as longitudinal pass 38 of the cartridge.

Figure 11A:
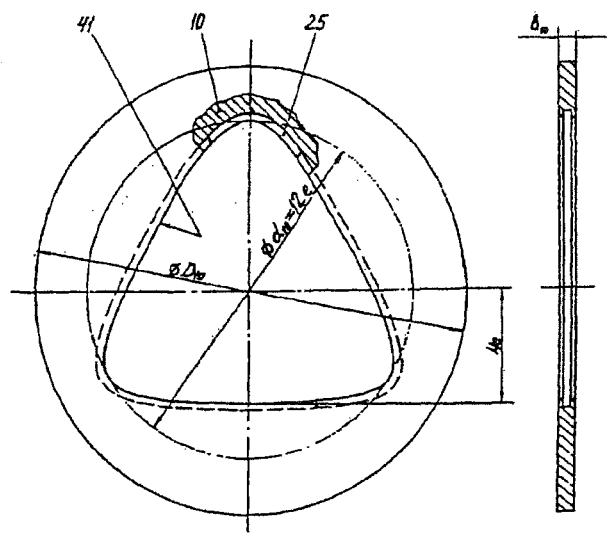
Figure 11B:
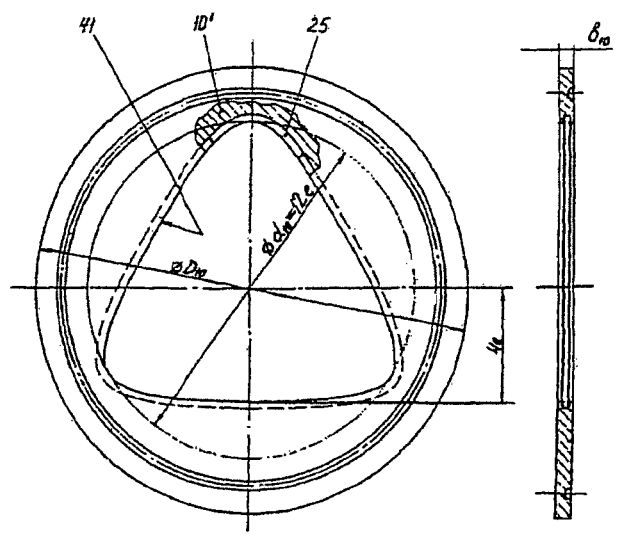

Movable wall 10 and 10' (FIG. 1, 2, 11) is shaped as washer with central hole 41 machined over the same hypotrochoid as pistons but with tolerance allowing free and hermetic travel of the piston through the hole. Seal groove 25 can be machined along the whole perimeter of the hole. FIGS. 1, 2b and 11a represent flat faced wall 10 under clamps 9 and 9'. FIGS. 2a and 11b represent wall 10' with one flat face and other with race for compensator rollers under thrust rolling compensator 27.

Control arm 6 or 6' (FIG. 1, 2) for cartridge displacement driving can be designed in different ways of attachment to the cartridge and control system elements (for example, hydraulic, mechanical with driving screw, worm and so on). The simplest solution for manual control—rod 6', screwed with threaded end in the cartridge, is shown in the FIG. 2. FIG. 1 represents flange version of control arm 6 attachment. The thickness of the arm section, entering in the housing opening, should be equal to the opening width to prevent cartridge turn.

Adjusting washers or inserts 11 (FIG. 1,2) intended as for adjusting of caps 8 and 8', clamps 9 and 9' as well as compensators 27 pressing against faces of pistons 3, 3' 3" correspondingly and movable walls 10, 10', assuring their free, but without looseness travel during transmission functioning. The adjustment occurs by screwing caps, clamps or compensator fasteners in the housing or cartridge respectively. Washers place under the fasteners, but inserts between them. Washers can be done of metal of different calibrated thickness or of non metallic elastic in compression material like rubber, polyurethane and similar. Washers and inserts can be substituted with flat rings of mentioned materials, which inner and outer diameters are equal to the corresponding diameters of the housing and cartridge, as well provided with hols for fasteners.

All seals are of ring type made of cord with round or other cross-section. Seal material—elastic oil resistant rubber, polyurethane and so on. The seals disposed in corresponding grooves of the parts. Seals 22, . . . 26 intended for assuring fluid tight contact between moving parts, seal 21 between stationary parts (FIG. 1, 2) Precise machining of mating parts allows avoiding some of the mentioned seals.

Each rotating part and both rotors assemblies of the transmission should be statically and dynamically balanced to prevent noise and vibrations during transmission operation. Balancing can be done in two ways:
  rotors are balanced by adding on the shaft counterweights on eccentric parts of the shaft with piston;
  by material cutting out from inside of the shaft along the whole length from eccentricity side. The same part of the cam should also be hollow. Sides opposite to the caves should be ballasted.

Operational sequence of the device functioning is presented below on the base of described above design of the transmission for the device version according FIG. 2a.
  Let's admit the following source data:
  shaft 1' will be used as driving and shaft 2 as driven
  let's take initial stabilized condition, when the transmission ratio u remains constant and the control arm 6' position corresponds the equal distance from the movable walls 10' to the core 5', that is $h_1=h_2$.
  parts of the pistons $3_{01}$ and $3_{02}$ (depicted with thin lines in FIGS. 12 and 13) pertaining to driving 1' and driven 2 shafts correspond the initial position of the device.

At any given time the piston profile in its cross-section has not less than 4 contact points with the cartridge, which divide the space between the piston and the cartridge in parts with variable volumes. Initial lengths (along longitudinal axis of the device) of all the cavities inside the cartridge are equal, so the total volume around the driving shaft is the same as around the driven shaft.

Figure 12A:
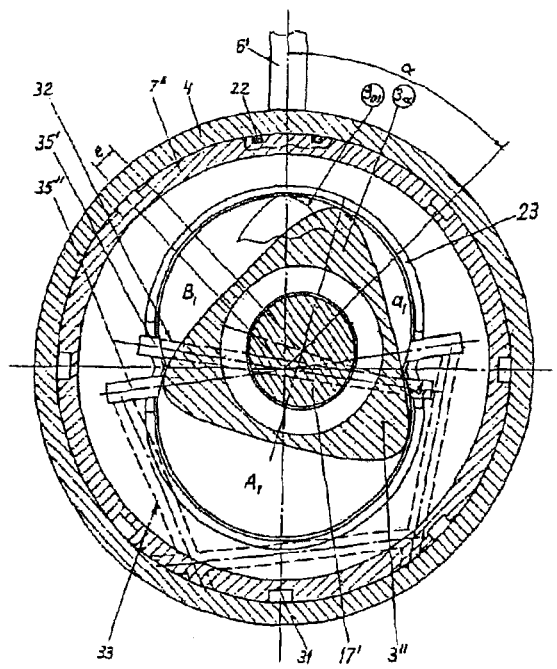
Figure 12B:
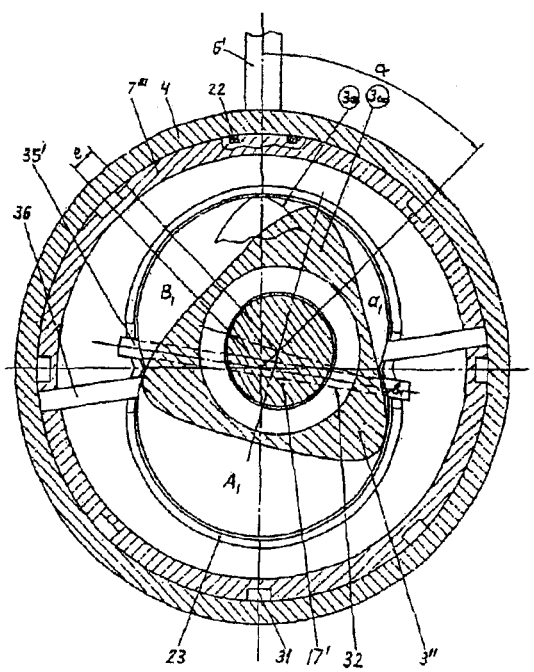

On driving shaft 1' with the cam 17' turning clockwise by angle α the piston moves to the position $3_α$, fluid expels from cavities $A_1$ and $α_1$ then through channels 35" (FIG. 12a) or 36 (FIG. 12b) and external cavity inflows to the cavities $A_2$ and $α_2$ (FIGS. 13a and 13b), turning shaft 2 with cam 17 in opposite direction by angle β. At the same time the driven piston takes position $3_β$, fluid expels from the cavities $B_2$ and $b_2$ and through channels 35' inflows to the expanding cavities $B_1$ and $b_1$ (FIG. 12a, 12b). At that, irregularity of fluid quantity variation in cavities under same pressure lines up by fluid overflow through by-pass channel 33 (FIG. 12a) and core boring 32 (FIG. 12A, 12b).

Such circulation processes take place continuously in all the channels and repeats in different cavities pressing successively on each part of the piston, so that the driven shaft rotates continuously.

On the shaft 1' rotating in opposite direction—counter clockwise—all the above mentioned fluid flows change their flow and pressing directions making the driven shaft rotates in opposite direction.

The shafts rotations speeds are oppositely directed and due to the initial equity of the fluid volumes around them also equal in absolute value. Variation of the control arm 6' position so, that $h_1 \neq h_2$ the fluid volumes in the cartridge on the right and on the left of the core 5' also will be different, causes nonequity of rotation speed $n_1$ and $n_2$ the shafts 1' and 2. The transmission ratio is equal $u=n_2/n_1=h_1/h_2$. The ratio can be varied from 0 (motionless driven shaft) up to maximal value.

Reference parameters to evaluate the transmission dimensions and power are:
  basic structural parameter—eccentricity between axes of rotation of the pistons and shafts e;
  maximal power fluid pressure $p_{max}$;
  maximal displacement of the control arm (cartridge displacement) H;
  the core thickness $b_5$.

The following ratios should be observed for regular operation of the device, where all the equations and notations in entries 1-4 and 8 refer to all versions of hydro transmission, but for entries 5, 6 and 7 presented separate equations for basic (FIG. 1) and shortened reducing version (FIG. 2):
  1. diameter of fixed gear 16 pitch circle is equal to $d_d=4e;$ 2. diameter of rotating gear 15 pitch circle is equal to $D_d=6e;$ 3. the curve of pistons 3, 3' and 3" (FIG. 1, 2) profile should be hypotrochoid, described in Cartesian ordinates as:

$X_3=e(5 \sin \tau - \sin 2\tau),$ $Y_3=e(5 \cos \tau + \cos 2\tau),$ where arbitrary parameter $t=0-2\pi$;
  4. contour of the outer surface of the core 5, 5', 5" (FIG. 9) and the cross-section of the internal opening 38 of the cartridges 7, . . . , $7^{IV}$, (FIG. 4, . . . , 8) is closed polyline, which is external part of epytrochoid rolled off with sliding from within by piston's hypotrochoid and having two axes of symmetry, length of the major axis $L_5=14e$, length of the minor axis $l_5=10e$; equation of hypotrochoid in Cartesian ordinates are:

$$X_7 = \frac{e}{7}(24 \sin \tau + 25 \sin 3\tau),$$

$$Y_7 = \frac{e}{7}(24 \cos \tau + 25 \cos 3\tau).$$

5. length of the cartridge opening 38 should be
  $L_7 \geq H+b_5$ for basic version of the transmission (FIG. 1) and
  $L_7 \geq 2H_{short}+b_5$ for shortened reducing transmission (FIG. 2);
  6. length of the piston should be:
  $L_3 > l_7-b_5$ for normal pistons for both versions of the transmission n (FIG. 1, 2a) and
  $L_{3\ short} > (l_7-b_5)/2$ for short piston in reducing shortened transmission (FIG. 2a);
  7. length of the housing cavity between internal faces of the caps is equal to
  $L_4=2L_3+b_5$ for basic version (FIG. 1) and
  $L_{4\ short}=L_3+L_{3\ short}+b_5$ for shortened reducing transmission (FIG. 2a);

8. the ratio of the hydraulic transmission is equal to the ratio of distances $h_1$ and $h_2$ of the core from movable walls (FIG. 1, 2), i.e., $$u = n_2/n_1 = h_1/h_2,$$

where $n_1$ and $n_2$—rotation speeds of driving and driven shafts.

REFERENCE LIST

1. Richard van Basshuysen/Fred Schafer (Hrsg.). Handbuch Verbrennungsmotor. Grundlagen, Komponenten, Systeme, Perspektiven. 3., vollstandig uberarbeitete and erweiterte Aufla. ATZ/MTZ Fachbuch;
2. V. K. Vakhlamov, M. G. Shatrof, A. A. Yurchevsky. Cars. Theory and construction of cars and motors. Textbook. Moscow. Publishing centre "Academy". 2010.

LIST OF ELEMENT NOTATIONS IN THE FIGURES

1 - left shaft
1' - shortened driving shaft
2 - right shaft
3 - piston with toothed rim
3' - simple piston
3" - shortened piston
4 - housing
5 - simple core
5' - core with 1 channel
5" - core with 2 channels
6 - flanged arm
6' - rod arm
7 - cartridge with 4 channels of different depth
7$^I$ - cartridge with 4 end flow channels and 2 deep flow channels
7$^{II}$ - cartridge with deep and shallow flow channels
7$^{III}$ - cartridge with 2 shallow flow channels and 4 end channels
7$^{IV}$ - cartridge with 4 shallow flow channels
8 - cap with toothed rim
8' - simple cap
9 - clamp with circular hole
9' - clamp with shaped hole
10 - movable wall for clamp accommodating
10' - movable wall for compensator accommodating
11 - adjusting washer
12 - housing opening
13 - mounting pad for control arm fixing
14 - fitting
15 - tooth wheel
16 - gear
17 - shaft cam
17' - shortened shaft cam
18 - cap shell bearing
19 - piston shell bearing
20 - core shell bearing
21 - cap seal
22 - Housing opening seal
23 - cartridge seal
24 - core seal
25 - movable wall seal
26 - shaft seal
27 - thrust rolling compensator
28 - cap ball bearing
29 - piston ball bearing
30 - core ball bearing
31 - outer axial cartridge channel
32 - core boring
33 - combined by-pass channel of the cartridge
34 - circumferential by-pass channel
35 - flow channel of variable depth
35' - shallow flow channel of the cartridge
35" - deep flow channel of the cartridge
36 - slotted end channel of the cartridge
37 - cartridge end boring
38 - longitudinal pass in the cartridge
39 - threaded holes in the cartridge for fastening
40 - central circular hole of the clamp
40' - central shaped hole in the clamp
41 - hypotrochoid hole in the movable wall
42 - by-pass channel plug

The invention claimed is:
1. A controlled hydraulic transmission comprising:
a housing;
a plurality of caps;
two shafts;
a control unit; and
rotary mechanism of interaction with power fluid,
wherein a gear transmission is installed between one of the plurality of caps and one of a plurality of pistons of the rotary mechanism,
wherein the plurality of pistons of the rotary mechanism interact with the power fluid and are provided with sunk internal gearing,
wherein faces of the plurality of the pistons are machined to provide sliding contact with the plurality of the caps and core faces, and
wherein an outer surface of the plurality of pistons is formed by hypotrochoid that is defined by:

$$X = e(5 \sin \tau - \sin 2\tau),$$

$$Y = e(5 \cos \tau + \cos 2\tau),$$

where $\tau$ is an arbitrary parameter between 0 and $2\pi$.

2. The controlled hydraulic transmission according to claim 1, wherein the housing has an opening for a control arm and an internal cavity completely filled with the power fluid and a mechanism of rotary movement transformation.

3. The controlled hydraulic transmission according to claim 2, wherein control unit is provided with a jutting arm fixed on an internal mechanism of rotary movement transformation and being able for displacement along the opening in the housing.

4. The controlled hydraulic transmission according to claim 3, wherein an internal face of the plurality of caps, mounted on housing ends, is machined to provide sliding contact with the faces of the plurality of the pistons, at that the plurality of caps have a central hole for supporting the two shafts and fixed central gear internally toothed with a piston gear.

5. The controlled hydraulic transmission according to claim 4, wherein the shafts provided with cam having cylindrical surface eccentric against a shaft axis of the shafts with eccentricity e and intended for running fit of a piston.

6. The controlled hydraulic transmission according to claim 1, wherein central sockets are machined in cartridge ends for disposing other parts and there is mounting pad for control arm attachment on an external surface, and central opening cross-section profile is the external curve of epitrochoid:

$$X = \frac{e}{7}(24 \sin \tau + 25 \sin 3\tau),$$

$$Y = \frac{e}{7}(24 \cos \tau + 25 \cos 3\tau).$$

7. The controlled hydraulic transmission according to claim 6, wherein there are partitions with flat end faces having sliding contact with the pistons end faces, central borings for running passages of driving shafts and the external surface, formed by the same epitrochoid as of the cartridge longitudinal opening cross-section, but with tolerances allowing longitudinal displacement of the cartridge relative the core.

8. The controlled hydraulic transmission according to claim 7, wherein movable walls, placed in sockets of the cartridge ends, have sliding contact with a bottom of the socket and with clamp and are disc shaped with external diameter greater then 16e but a central hole formed by the same hypotrochoid as the external surfaces of the pistons with tolerances allowing piston travel through the hole.

9. The controlled hydraulic transmission according to claim 8, wherein a plurality of clamps with a plurality of plain internal end faces, having sliding contact with a movable wall, and the central hole are attached to the cartridge ends.

10. A controlled hydraulic transmission comprising:
   housing with opening for control arm fixed on internal mechanism of rotary movement transformation and internal cavity filled with power fluid and said rotary movement transformation;
   caps, which internal face is machined to assure sliding contact with a piston face, the caps having hole for supporting two shafts,
   wherein the two shafts are provided with a cam having cylindrical surface eccentric against of the shaft with eccentricity e and intended for running fit of a piston,
   wherein the piston of the rotary movement transformation interact with the power fluid and is provided with sunk internal gearing,
   wherein the face of the piston is machined to provide sliding contact with the caps, and
   wherein an outer surface of the piston is formed by hypotrochoid that is defined by:

$$X = e(5 \sin \tau - \sin 2\tau),$$

$$Y = e(5 \cos \tau + \cos 2\tau),$$

where $\tau$ is an arbitrary parameter between 0 and $2\pi$.

11. The controlled hydraulic transmission according to claim 10, wherein central sockets are machined in cartridge ends for disposing other parts and there is mounting pad for control arm attachment on an external surface, and central opening cross-section profile is the external curve of epitrochoid:

$$X = \frac{e}{7}(24 \sin \tau + 25 \sin 3\tau),$$

$$Y = \frac{e}{7}(24 \cos \tau + 25 \cos 3\tau).$$

12. The controlled hydraulic transmission according to claim 11, wherein there are partitions with flat end faces having sliding contact with the pistons end faces, central borings for running passages of driving shafts and the external surface, formed by the same epitrochoid as of the cartridge longitudinal opening cross-section, but with tolerances allowing longitudinal displacement of the cartridge relative the core.

13. The controlled hydraulic transmission according to claim 12, wherein movable walls, placed in sockets of the cartridge ends, have sliding contact with a bottom of the socket and with clamp and are disc shaped with external diameter greater then 16e but a central hole formed by the same hypotrochoid as the external surfaces of the pistons with tolerances allowing piston travel through the hole.

14. The controlled hydraulic transmission according to claim 13, wherein a plurality of clamps with a plurality of plain internal end faces, having sliding contact with a movable wall, and the central circular or shaped hole are attached to the cartridge ends.

* * * * *